United States Patent [19]
Breternitz, Jr.

[11] Patent Number: 6,044,220
[45] Date of Patent: Mar. 28, 2000

[54] METHOD AND APPARATUS FOR OPERATING A DATA PROCESSOR TO EXECUTE SOFTWARE WRITTEN USING A FOREIGN INSTRUCTION SET

[75] Inventor: Mauricio Breternitz, Jr., Austin, Tex.

[73] Assignee: Motorola, Inc., Schaumburg, Ill.

[21] Appl. No.: 08/806,880

[22] Filed: Feb. 25, 1997

[51] Int. Cl.[7] .................................................... G06F 5/00
[52] U.S. Cl. ........................ 395/705; 395/707; 395/500
[58] Field of Search .................................. 395/705, 707, 395/500, 568

[56] References Cited

U.S. PATENT DOCUMENTS

| 5,551,015 | 8/1996 | Goettelmann et al. | 395/705 |
|---|---|---|---|
| 5,574,873 | 11/1996 | Davidian | 395/568 |
| 5,742,794 | 4/1998 | Potter | 395/500 |
| 5,758,140 | 5/1998 | Kahle et al. | 395/500 |
| 5,768,593 | 6/1998 | Walters et al. | 395/707 |
| 5,802,373 | 9/1998 | Yates et al. | 395/705 |
| 5,842,017 | 11/1998 | Hookway et al. | 395/707 |

*Primary Examiner*—Tod R. Swann
*Assistant Examiner*—Matthew Smithers
*Attorney, Agent, or Firm*—Paul J. Polansky

[57] ABSTRACT

An instruction set interpreter and translator provides dynamic idiom recognition by use of a programmable hash table. Idioms are sequences of consecutive instructions that occur frequently during execution. Interpretive execution of such idioms is optimized to attain high performance. Idioms are recognized dynamically during interpretive execution. A programmable hash table is extended with entries corresponding to newly recognized idioms as their frequency of occurrence exceeds a threshold.

9 Claims, 9 Drawing Sheets

| INPUT STATE | a | b | c | d |
|---|---|---|---|---|
| S1 | S2, 1 | | S3, 3 | |
| S2 | | S4, 2 | | |
| S3 | | | | S4, 0 |
| S4 | | | S3, 0 | S1, 1 |

| KEY VALUE (STATE, INPUT) | ACTION |
|---|---|
| S1, a | S=S2, OUTPUT 1 |
| S1, c | S=S3, OUTPUT 3 |
| S2, b | S=S4, OUTPUT 2 |
| S3, d | S=S4, OUTPUT 4 |
| S4, d | S=S1, OUTPUT 1 |
| S4, c | S=S3, OUTPUT 0 |

METHOD AND APPARATUS FOR OPERATING A DATA PROCESSOR TO EXECUTE SOFTWARE WRITTEN USING A FOREIGN INSTRUCTION SET

FIELD OF THE INVENTION

This invention relates in general to data processors, and more specifically to methods of operating a data processor to execute non-native software.

BACKGROUND OF THE INVENTION

Migration to new microprocessor architectures requires emulation of foreign instruction sets to preserve existing software investment. For example, many personal computers (PCs) have been based on the so-called "x86" instruction set which began with the 8086 microprocessor developed by the Intel Corporation of Santa Clara, Calif. Because of the large number of x86-based PCs purchased, much software was written with the x86 instruction set. However it would be desirable to execute this existing software in computers based on other types of microprocessors.

Two known approaches to solving this problem are translation and interpretive execution. Translation converts opcodes from the foreign architecture into a sequence of native operations. Translation may be static or dynamic. Static translation is limited to the information that can be gathered statically about the program, and thus dynamically loaded libraries and self-modifying programs are a problem to the static translation approach. Dynamic translation generates native code "on the fly" while the program is executing. The key phases of instruction set emulation are the dispatch phase (corresponding to the fetch and decode phases of a microprocessor) and the execute phase. The dispatch phase creates most of the overhead associated with the emulation process. Overhead in the execute phase comes from architectural mismatch between the foreign and the native architectures.

Interpretive execution uses a fast dispatch mechanism to decode the foreign instruction set opcode and execute a native routine to perform the equivalent function. Interpretation keys off the guest instruction's opcode to dispatch the semantic routine for each guest instruction by decoding the guest instruction's opcode. A state-machine-like mechanism is used to control the (possibly multi-byte) decoding. Translation maps a sequence of guest instructions into native code. During execution, the simulated guest program counter is mapped to the native program counter of the location containing the translated instruction sequence. The mapping is usually performed with a hash table.

Interpretive execution suffers the overhead of decoding (repeatedly) each instruction as it is encountered. Translation avoids this overhead, because the instruction is decoded once, at translation, and possibly executed several times. Furthermore, optimization is performed at translation time, thus resulting in more efficient code. However, translation incurs code size expansion overhead.

A better solution is to combine interpretive execution with translation. This combined approach uses interpretive execution for low-frequency instructions and translates natively those instruction sequences that take up most of the execution time. The combined approach achieves the low-overhead in code size while allowing for the speed improvements of translation. The key problem with the combined approach is the transition between interpretive and translated execution: the interpreter must recognize when it reaches the first instruction of a block that has been translated into native code. The usual solution is to introduce a new opcode that triggers this transition. Introducing a new opcode requires a change to an executable program, which entails problems for shared executables and requires operating system support. Furthermore, the combined approach adds overhead for interpreting the new opcode.

Another solution is to use "turbo" sequences of machine idioms. Machine idioms are sequences of guest machine instructions that occur frequently. An example of such a sequence is a tight loop that polls the status of an input/output (I/O) port. Such idioms have strict timing requirements that cannot be met by regular interpretation. The turbo sequence recognition approach expands the interpreter's decoding routine to recognize an extended instruction set that includes the idioms. However turbo sequence recognition is restricted to the idiom set that is known in advance. Idiom sequences which depend on program execution cannot be recognized in advance.

What is needed then is a method for improving on these known techniques of emulation so that new microprocessors may be able to run existing software. The present invention provides such a method and a corresponding data processor, whose features and advantages will be more clearly understood from the following detailed description taken in conjunction with the accompanying drawings.

BRIEF DESCRIPTION OF THE DRAWINGS

A better understanding of the present invention can be obtained when the following Detailed Description is considered in conjunction with the following drawings, in which.

DETAILED DESCRIPTION OF THE DRAWINGS

According to the present invention, idioms are recognized "on-the-fly", i.e., dynamically. Dynamic idiom recognition is achieved by recognizing sequences of instruction opcodes that occur frequently and by creating special translations from them. The key idea is to extend the state machine that recognizes an opcode: when the opcode is recognized and the decoder routine is about to finish execution, it checks the following opcode and stores that information in a table. If the frequency of occurrence of that opcode exceeds a predetermined threshold, an extended idiom is created and added to the state machine. This recognition may be optimized for the failure case by assuming that, after a while, most idioms will be recognized and the state machine will account for most important idioms.

Figure 1:
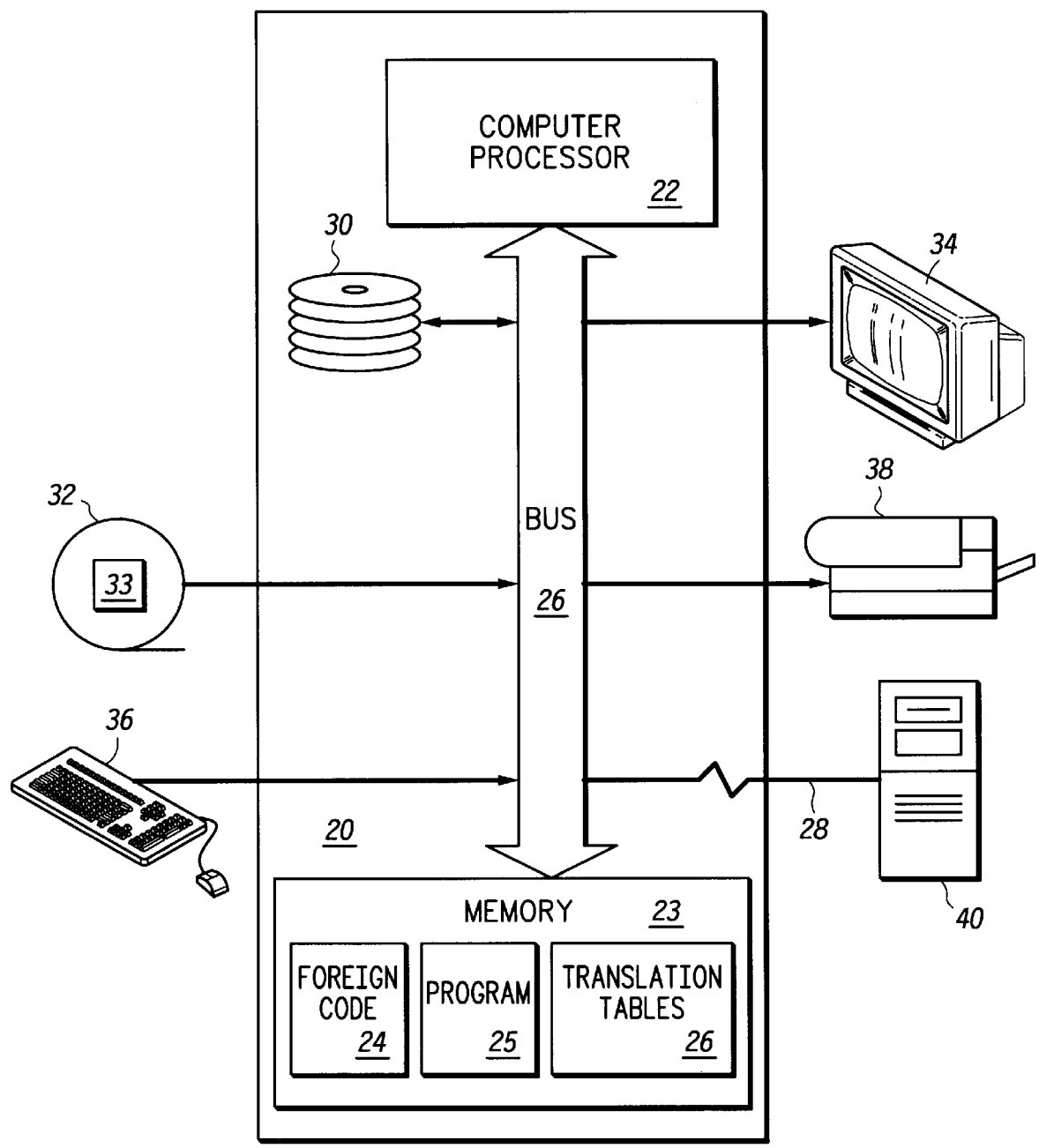
FIG. 1 illustrates a block diagram of a data processing system for use with the present invention.

The present invention may be better understood with reference to FIG. 1, which illustrates a block diagram of a data processing system 20 for use with the present invention. The data processing system 20 has a central processing unit 22, and Memory 23, connected by a Bus 26. Memory 23 includes relatively high speed machine readable media such as DRAM, SRAM, ROM, FLASH, EEPROM, and bubble memory. Also connected to the Bus are usually Secondary Storage 30, External Storage 32, output devices such as a monitor 34, input devices such as a keyboard (with mouse) 36, and printers 38. Secondary Storage 30 includes machine readable media such as hard disk drives, magnetic drum, and bubble memory. External Storage 32 includes machine readable media such as floppy disks, removable hard drives, magnetic tape, CD-ROM, and even other computers, possibly connected via a communications line. The distinction drawn here between Secondary Storage 30 and External Storage 32 is primarily for convenience in describing the invention. As such, it should be appreciated that there is substantial functional overlap between these elements. Executable versions of computer software 33, such as the interpreters and translators utilized to implement the techniques disclosed herein and foreign programs can be read from the External Storage 32 and loaded for execution by the central processing unit 22 directly into the Memory 23, or stored on the Secondary Storage 30 prior to loading into Memory 23 and execution.

Memory system 23 includes a first area 24 for storing foreign code, a second area 25 which stores the emulator software, and a third area 26 which stores tables which are used in conjunction by the emulator software. Note also that typically when the emulation operating system is launched, it will cause emulator software area 25 to be loaded into local memory 23 from External Storage 32 or Secondary Storage 30 and will set up tables area 26. Foreign code 24 will be loaded when a user selects a foreign program for execution.

Figure 2:
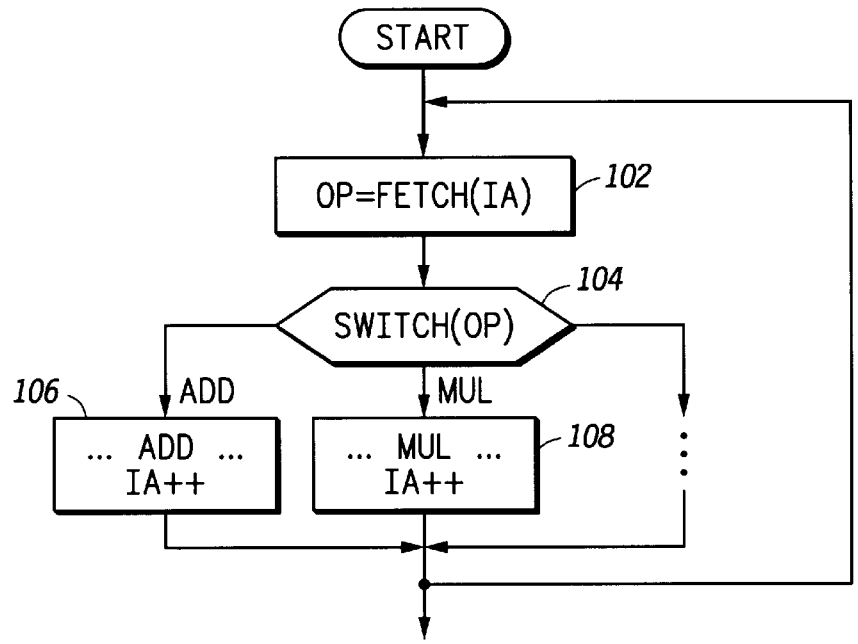
FIG. 2 illustrates a flow diagram of an interpreter known in the prior art.

FIG. 2 illustrates a flow diagram of an interpreter known in the prior art. It is a loop that starts by fetching an op code at instruction address (IA), step 102. Next, a multi-way decision or switch is made based on the op code, step 104. For example, if the code is an "add" instruction, the semantics of the "add" are executed, and the instruction address pointer (IA) is incremented, step 106. Likewise, if a "multiply" op code is encountered at step 104, the "multiply" semantics are executed and the instruction address pointer (IA) is incremented, step 108. Similar actions are performed on the other op codes encountered at step 104. In any case the loop repeats fetching the next op code at step 102.

Figure 3:
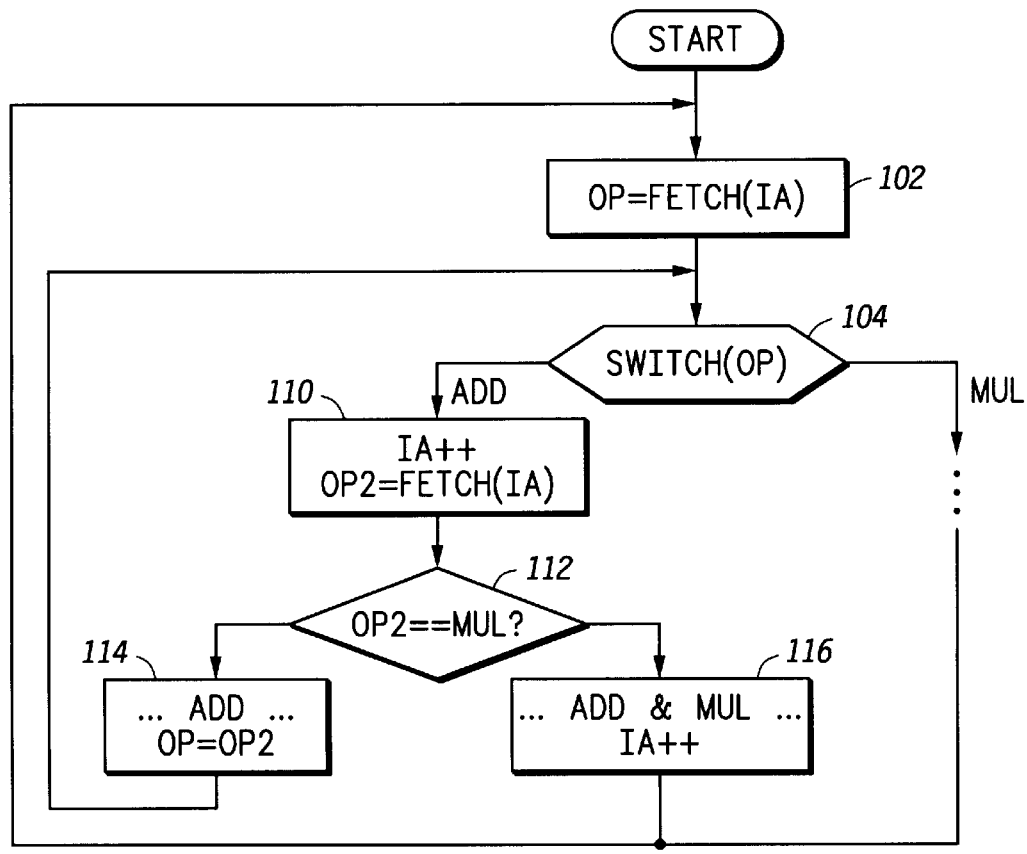
FIG. 3 illustrates a flow diagram of a turbo interpreter known in the prior art.

FIG. 3 illustrates a flow diagram of a turbo interpreter known in the prior art. It is similar to the interpreter shown in FIG. 2 with the capability of recognizing the common sequences of op codes. It differs in that an additional test can be made after detecting for example an "add" instruction when the next instruction is a "multiply". This is done by incrementing the instruction address (IA), and then fetching the op code at the new instruction address, step 110. Then, a test is made whether the new op code is a "multiply" instruction, step 112. If that is the case, then a add/multiply sequence has been encountered, and an optimized execution of the "add" and "multiply" instructions is made. Then the instruction address counter (IA) is incremented. Otherwise, if the second op code was not a "multiply" instruction at step 112, only the "add" instruction is executed, and the next op code is set to the op code from second instruction fetched at step 110. In this case the method loops by utilizing the second op code fetched in step 102 as the op code in the switch statement at step 104. Otherwise, if either the instruction sequence being interpreted is not a turbo sequence, or an add/multiply instruction sequence was executed in step 116, normal looping is performed, repeating starting at the op code fetch at step 102.

Figure 4:
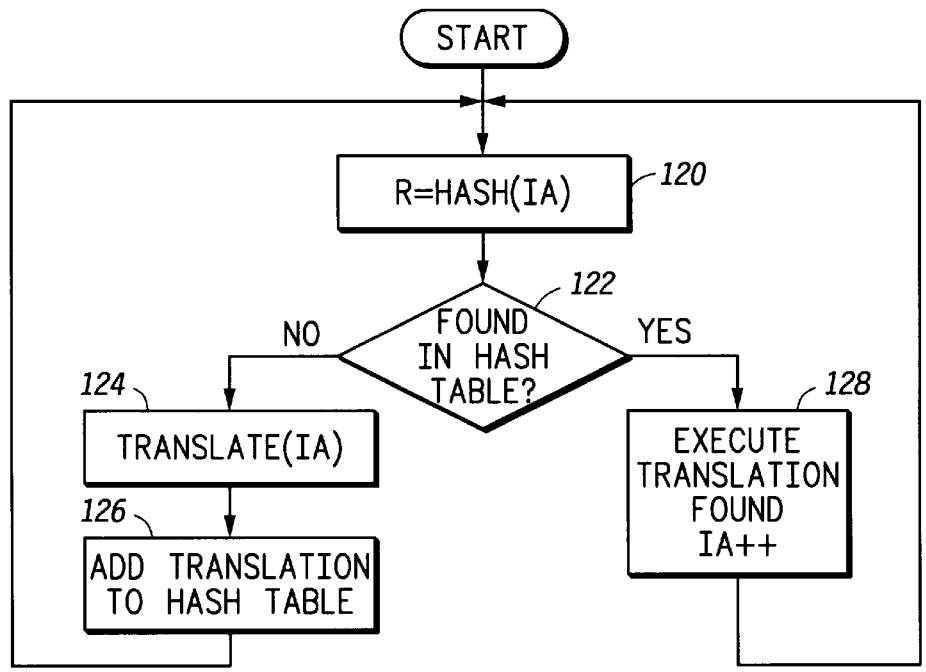
FIG. 4 illustrates a flow diagram of a translator known in the prior art.

FIG. 4 illustrates a flow diagram of an instruction translator known in the prior art. Again it operates as a loop. In this case, first the instruction address pointer (IA) is hashed or searched to determine if a translation exists, step 120. If it is found in the hash table, step 122, a translation was found, it is executed, and the instruction address (IA) is incremented, step 128. Otherwise, if the instruction address (IA) was not found in the hash table, step 122, the op code at that address is translated, step 124, and the translation is then added to the hash table, step 126. In either case, the loop repeats with the instruction address pointer (IA) hash in step 120. Note that the just translated op code just added to the hash table in step 126 will be found in the hash table in step 120. One alternative embodiment is that the newly translated op code is immediately executed and the instruction address pointer incremented in step 128.

Figure 5:
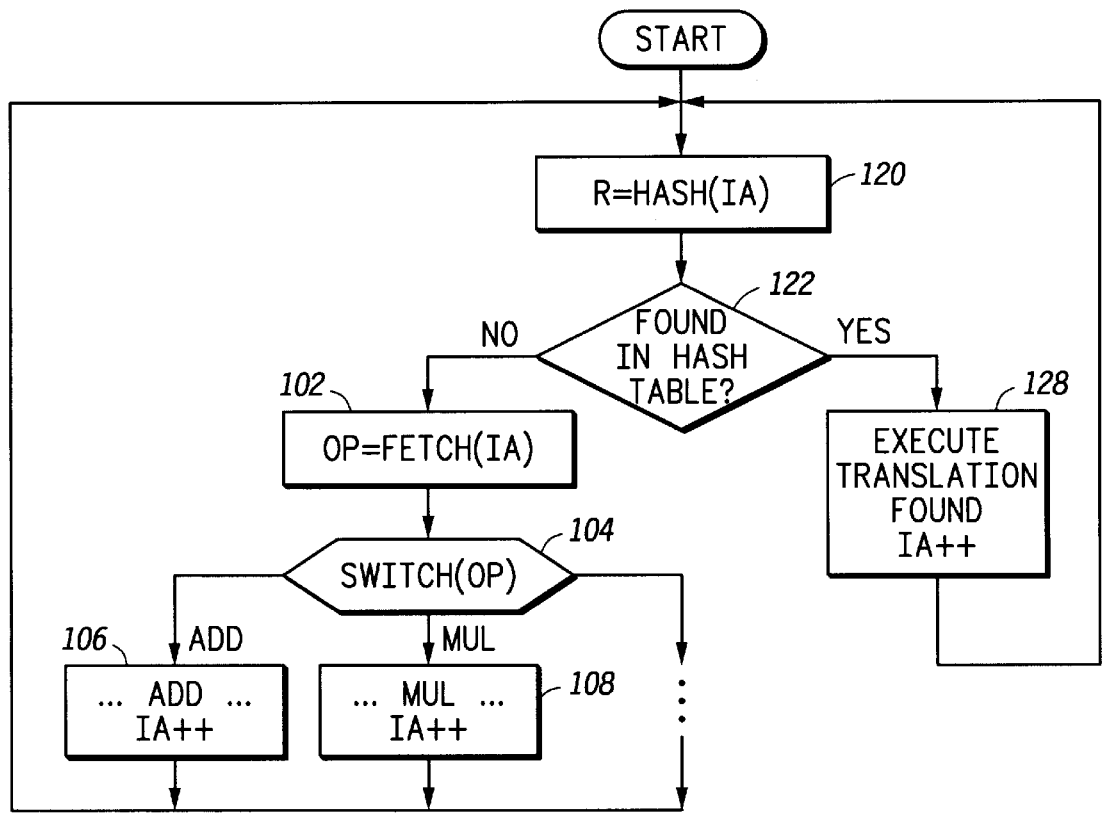
FIG. 5 illustrates a flow diagram of a combined interpreter/translator known in the prior art.

FIG. 5 illustrates a flow diagram of a combined interpreter/translator known in the prior art. It is a combination of the interpreter described in FIG. 2, and the translator described in FIG. 4. The address is first hashed, step 120. If the address is found in the hash table, step 122, it is immediately executed, step 128. Otherwise, the op code is fetched from the instruction address (IA), step 102, and a multi-way decision or branch is made based on the op code, step 104. As before, if the op code is an "add" instruction, the semantics of the "add" instruction are executed, step 106, and if the instruction op code is a "multiply" instruction, the semantics of the "multiply" instruction are executed, step 108. In all cases, the loop repeats, hashing the next instruction address (IA), step 120.

Figures 6, 7, 8:
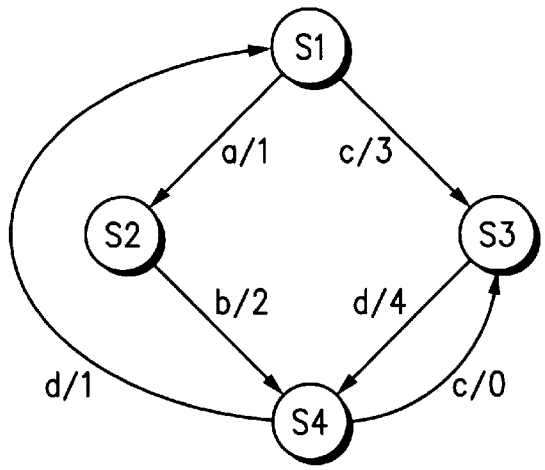
FIG. 6 illustrates a generalized state diagram useful in understanding the present invention.
FIG. 7 illustrates in tabular form a next state diagram associated with the state diagram of FIG. 6.
FIG. 8 illustrates in tabular form a hash table implementation of the state diagram of FIG. 6.

FIG. 6 illustrates a generalized state diagram useful in understanding the present invention. Circles represent states and edges represent transitions between states. Edges are labeled with their respective inputs and outputs. For example, in FIG. 6, the transition between state S1 to state S2 is an edge labeled with "a/1". The "a" is the input that causes the state transition. The "1" is the output generated by the state transition.

FIG. 7 illustrates in tabular form a next state diagram associated with the state diagram of FIG. 6. Rows are associated with states, and columns are associated with input values. The intersection of a given row (state) and given column (input) gives the next state transition and the output for that input at that state. Therefore, the intersection of row "S1" and input "a" provides the next state (S2) and output ("1") for the state transition.

FIG. 8 illustrates in tabular form a hash table implementation of the state diagram of FIG. 6. It has two columns. The first column contains a hash key, and the second column contains the corresponding action. For example, the first entry in FIG. 8 has a has key consisting of the tuple state "S1" and input "a". The corresponding action is the tuple consisting of next state (S2) and output ("1"). This corresponds to the state transition between S1 and S2 caused by input "a" and producing output "1". Thus for each state transition in state diagram in FIG. 6 there is a pair of state input keys associated with a pair of next state output actions in the hash table. It should be noted that the hash table in FIG. 8 contains the same information as the next state diagram in FIG. 7.

Figure 9:
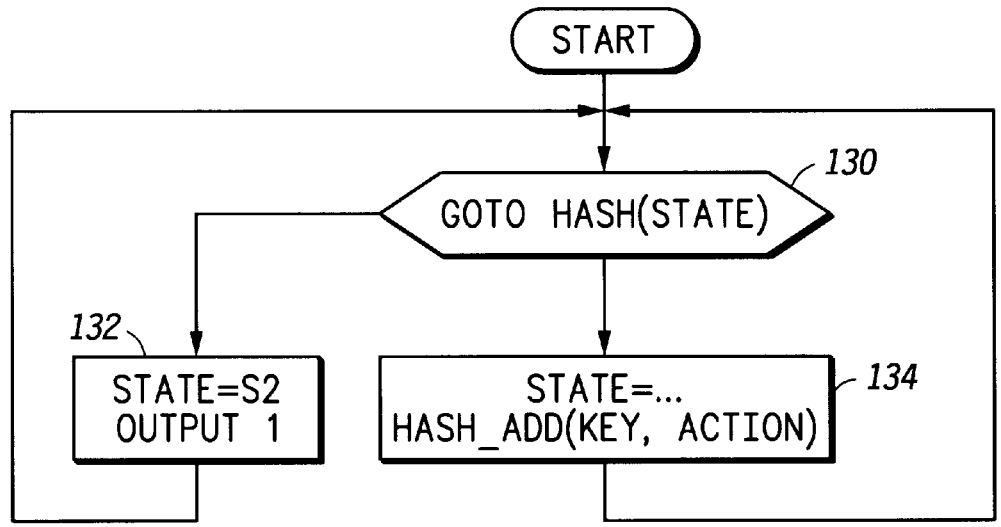
FIG. 9 illustrates a flow diagram of an extensible hash table implementation of a dynamic state machine.

FIG. 9 illustrates a flow diagram of an extensible hash table implementation of a dynamic state machine. This state machine is implemented as a loop. At the top of every loop, the hash key, a tuple of current state and input, is hashed at step 132. If the hash key is found in the hash table, the current state is set to the new state, and the output is generated from the hash table action entry, step 132. Otherwise, a new hash key tuple of current state and input, and a predetermined corresponding action tuple of next state and output are inserted in the hash table, step 134. The current state is then set to the next state and the output sequence is generated. In either case the method loops, again hashing on the current state and input key, step 130. This is a programmable state machine, since new states and state transitions can be added dynamically.

Figure 10:
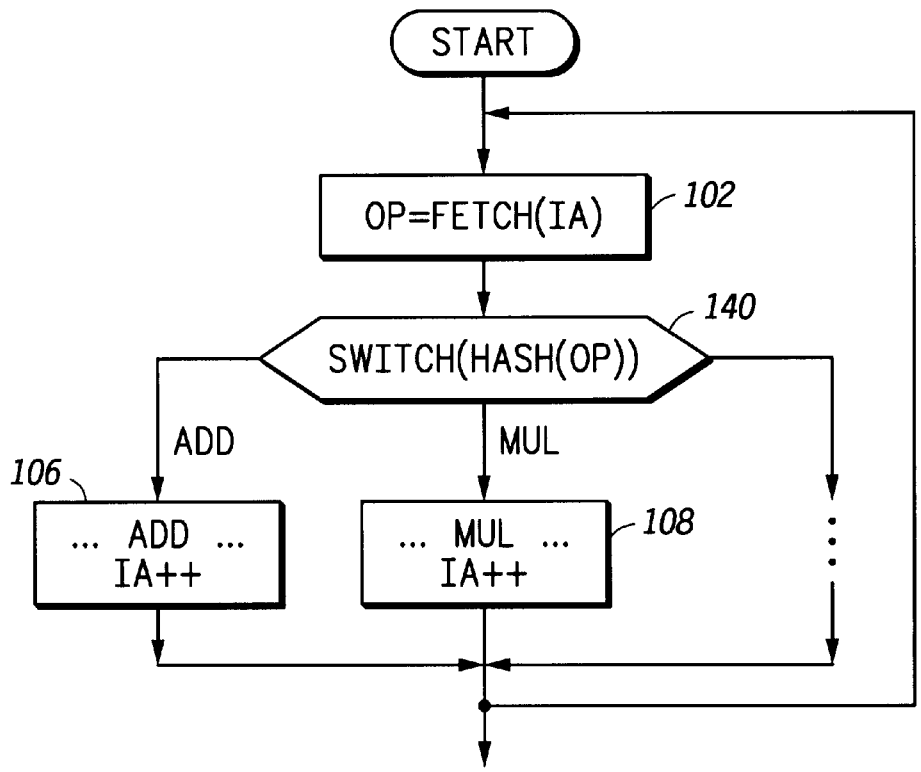
FIG. 10 illustrates a flow diagram of a hash table implementation of the interpreter such as shown in FIG. 2.

FIG. 10 illustrates a flow diagram of a hash table implementation of the interpreter such as shown in FIG. 2. The interpreter operates as a loop such as shown in FIG. 2. The loop starts by fetching the op code at instruction address pointer (IA), step 102. The op code is then hashed, and execution proceeds to the corresponding entry in hash table, step 140. Every op code will have an entry in the hash table. If the op code is an "add" instruction, the semantics of the "add" instruction are executed, and the instruction address pointer incremented, step 106. Likewise, if the instruction op code identifies a "multiply" instruction, "multiply" semantics are executed, and the instruction address pointer (IA) is incremented, step 108. In all instances, the interpreter loops again, fetching the next instruction op code, step 102.

Figure 11:
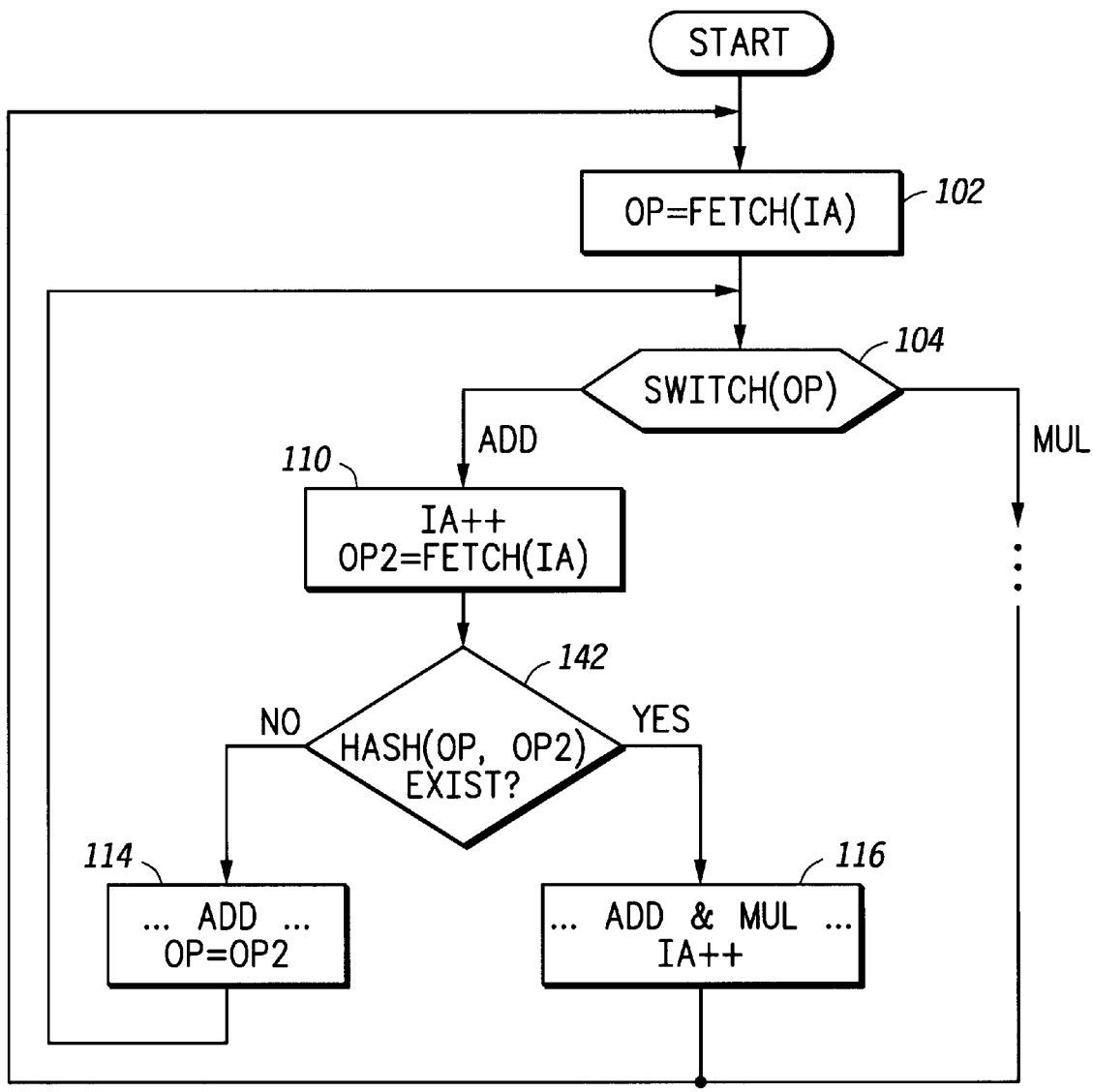
FIG. 11 illustrates a flow diagram of a hash table implementation of a turbo interpreter such as the one illustrated in FIG. 3.

FIG. 11 illustrates a flow diagram of a hash table implementation of a turbo interpreter such as the one illustrated in FIG. 3. The turbo interpreter operates as a loop similarly to the turbo interpreter in FIG. 3, with the exception that once an "add" op code is identified, step 104, and a second op code fetched, step 110, the first and second op codes are hashed, step 142. If the combination of first and second op codes is found in the hash table, step 114, optimized execution of the add/multiply instruction is performed, step 116. Otherwise, the current op code is set to the second op code fetched at step 110 and the "add" semantics are executed, step 114.

Figure 12:
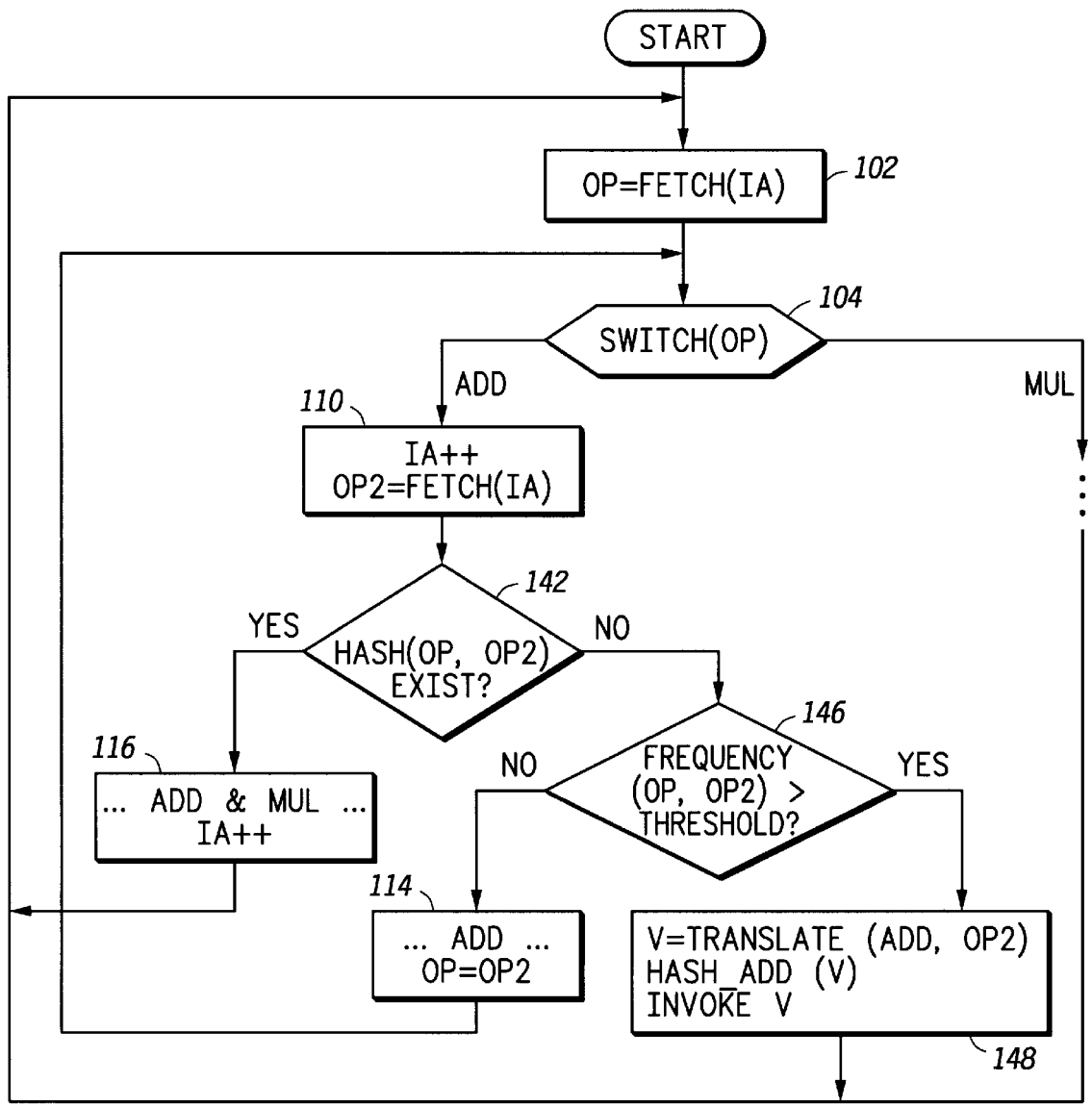
FIG. 12 is a flow diagram of a dynamic hash table implementation of a turbo interpreter that uses idiom recognition.

FIG. 12 is a flow diagram of a dynamic hash table implementation of a turbo interpreter that uses idiom recognition. Unlike the turbo interpreter of FIG. 3, the list of recognized idioms grows dynamically. The turbo interpreter operates as a loop similar to the hash table implementation of a turbo interpreter described in FIG. 1. The primary difference shown is that when an idiom is not recognized in the hash table, step 142, a test is made of the frequency of occurrence of the idiom, step 146. If the frequency exceeds a threshold, step 136, the idiom is translated into its optimized native code, the translated code is added to the hash table, and the new idiom is executed, step 142. Otherwise, in step 114 the single "add" op code semantics are executed and the current op code is set to the second op code previously fetched in step 110. This new methodology as described is capable of recognizing idioms of length two instructions. Those skilled in the art recognize that it is a straightforward extension to recognize longer idiom sequences.

Figure 13:
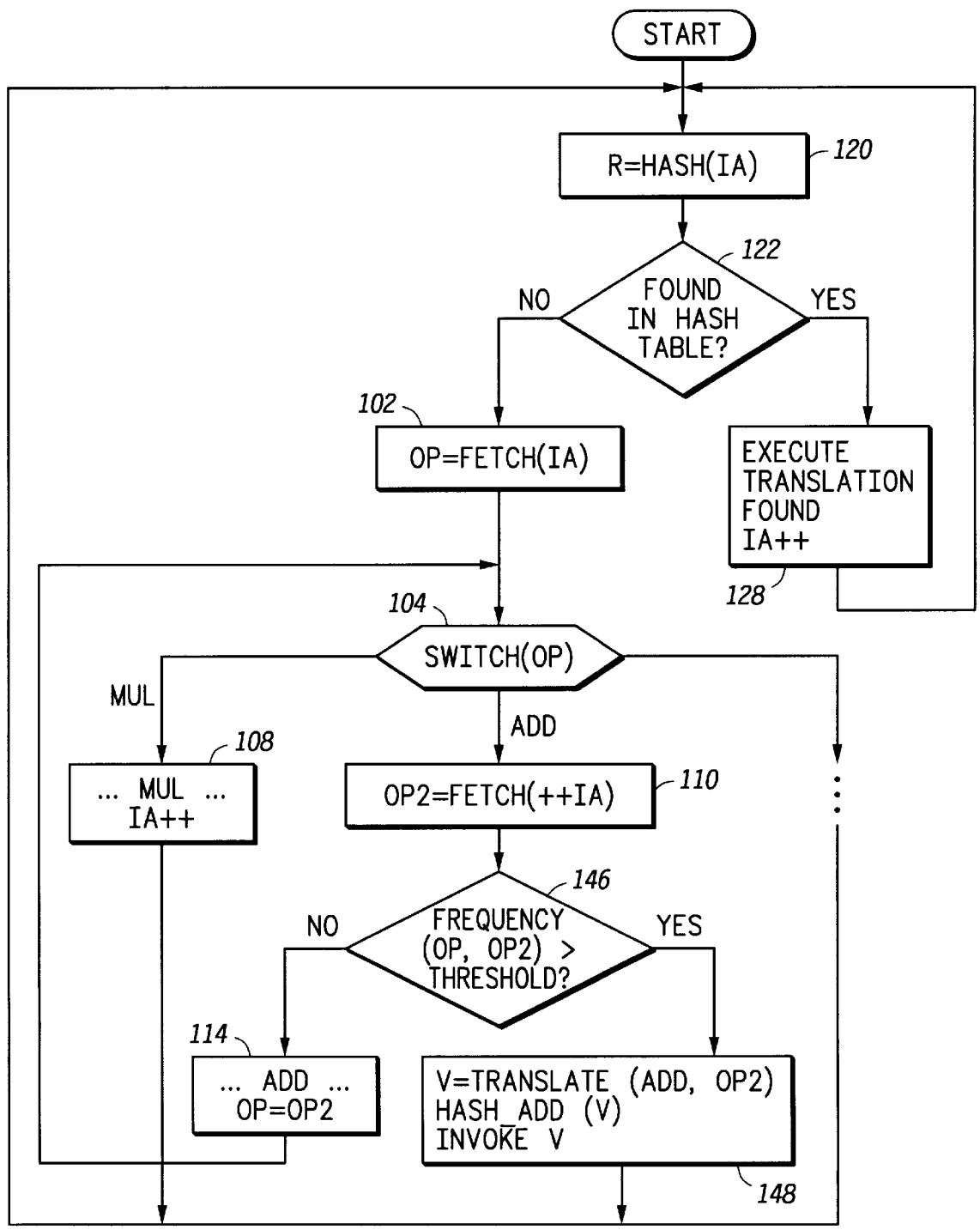
FIG. 13 is a flow diagram of a dynamic hash table implementation of a combined turbo interpreter/translator that uses idiom recognition.

FIG. 13 is a flow diagram of a dynamic hash table implementation of a combined turbo interpreter/translator that uses idiom recognition. Unlike the interpreter portion of FIG. 5, the list of recognized idioms grows dynamically. In FIG. 5, steps 102, 104, 106, 108 correspond to the interpreter section. Also FIG. 5, step 128 corresponds to the translation section. In FIG. 13, the new methodology replaces the interpreter section in FIG. 5 with the interpreter mechanism described in FIG. 12. Therefore steps 104, 106, 108 of FIG. 5 are replaced by steps 110, 142 ,116, 146, 114, 148 of FIG. 12. The result of this combined interpreter/translator is that idioms are recognized dynamically such as by the interpreter described in FIG. 12, while retaining translation capabilities.

Figure 14:
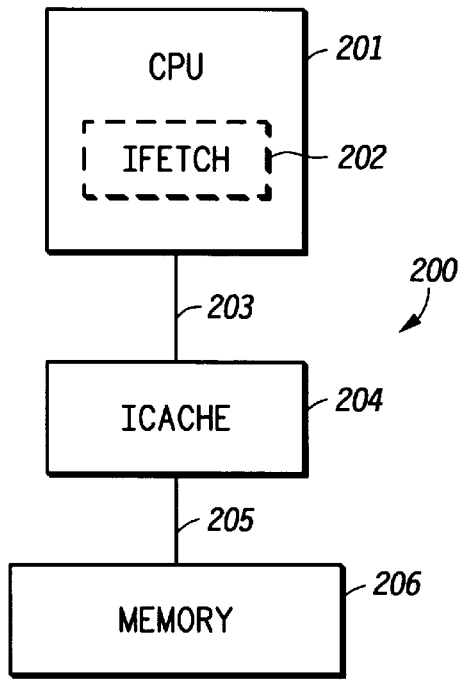
FIG. 14 illustrates in block diagram form a data processing system known in the prior art.

FIG. 14 illustrates in block diagram form a data processing system 200 known in the prior art. Data processing system 200 includes a central processing unit 201 which includes an instruction fetch unit labeled "IFETCH" 202. IFETCH 202 provides a steady stream of instructions for execution by CPU 201 to insert into the head of an execution pipeline. IFETCH 202 fetches these instructions via a local bus 203. An instruction cache labeled "ICACHE" 204 is coupled to IFETCH 202 via local bus 203. In response to an access via local bus 203, ICACHE 204 checks its internal storage to see if the requested data is in a valid cache line. If it is, then ICACHE 204 completes the access by providing the data element to IFETCH 202. If the data element is not present in ICACHE 204, then ICACHE 204 initiates a cache line fill from a main memory 206 via a system bus 205. Memory 206 provides the requested cache line to ICACHE 204, conventionally in critical-word-first format, so that ICACHE 204 may forward the data to IFETCH 202 before ICACHE 204 receives the whole cache line and stores it in a suitable internal location.

Data processing system 200 is optimized to provide as quickly as possible a constant stream of instructions to CPU 201 in order to minimize pipeline stalls and to make the most efficient use of local bus 203 and system bus 205. These architectural features make it difficult to convert a program written in a foreign instruction set, to the native language of CPU 201 without seriously affecting the performance of data processing system 200.

A hardware-assisted interpretation which uses an instruction path coprocessor to assist with the instruction dispatch was described by E. H. Debaere, *Interpretation and Instruction Path Coprocessing,* The MIT Press, 1990. The instruction path coprocessor fetches and decodes the foreign opcode and directs the native (micro) engine to continue execution at the target routine. Architecturally, access to the Instruction Path coprocessor looks like an indirect jump instruction.

Figure 15:
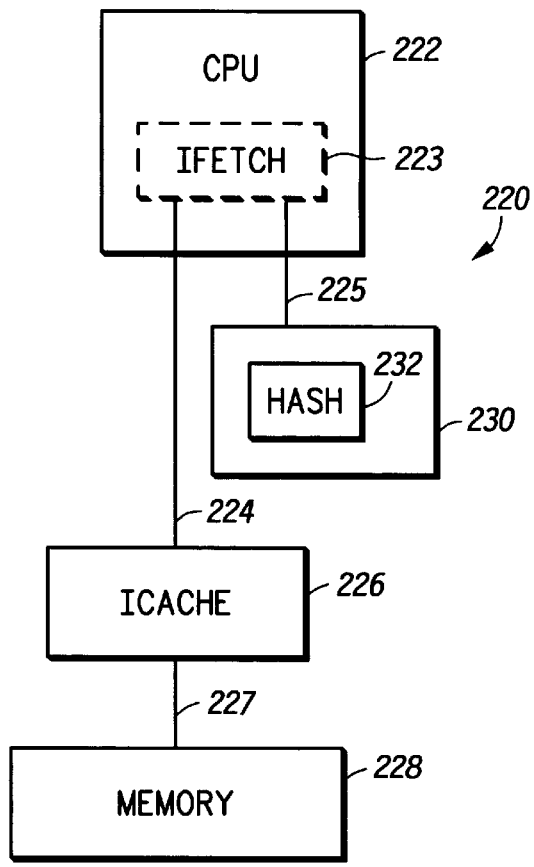
FIG. 15 illustrates in block diagram form a first embodiment of a data processing system according to the present invention.

An improved data processor architecture is illustrated with respect to FIG. 15, which illustrates in block diagram form a first embodiment of a data processing system 220 according to the present invention. Data processing system 220 includes a CPU 222 which includes an instruction fetch unit (IFETCH) 223. IFETCH 223 is coupled to a first local bus 224 and a second local bus 225, and requests instructions in a conventional manner from local bus 224. Also coupled to local bus 224 is an instruction cache (ICACHE) 226, which is also coupled via a system bus 227 to a main memory 228.

Data processing system 220 also includes a programmable instruction path coprocessor 230. Instruction path coprocessor 230 implements the interpreter's state machine in hardware, and uses both the instruction's opcode and the address in the foreign instruction space to dispatch execution. Instruction path coprocessor 230 may also recognize identical sequences of guest instructions (idioms).

In particular, IFETCH unit 223 recognizes a special instruction opcode which is designated the "GOTO_HASH" instruction. In response to receiving this instruction, IFETCH 223 provides the foreign instruction address to instruction path coprocessor 230 via local bus 225. It performs two operations concurrently. First, it fetches the memory contents at the specified address and decodes the foreign opcode. This decoding yields the address of the interpretive routine corresponding to that opcode. Second, it searches the address in an internal hash table 232, which is a cache-like data structure which checks whether there is a translation for the code at that address. If the search succeeds, execution is directed to the translated address and a new sequence of at least one opcode is provided to IFETCH 223 over local bus 225 for execution by CPU 222.

If the search fails, instruction path coprocessor 230 may create a new translation and add it to hash table 232. In this way, instruction path coprocessor 230 supports the modification of the finite state machines as described above. This mechanism implements the combined turbo interpreter/translator method illustrated in FIG. 13.

Figure 16:
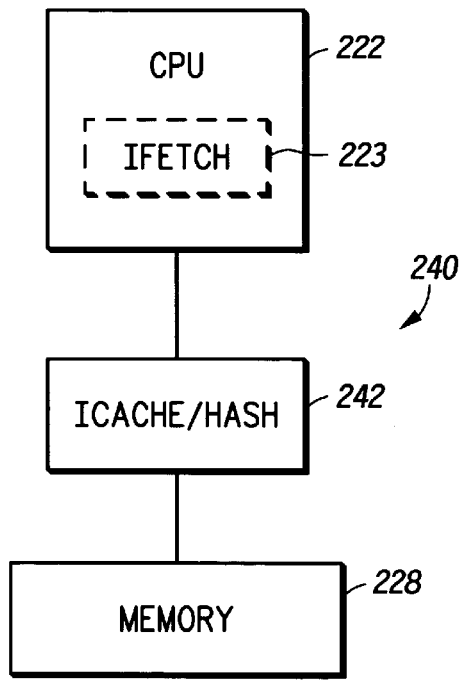
FIG. 16 illustrates in block diagram form a second embodiment of a data processing system according to the present invention.

An alternative implementation of an instruction path coprocessor is described with reference to FIG. 16, which illustrates in block diagram form a second embodiment of a data processing system 240 which may be used to implement the present invention. In FIG. 18 elements which are in common to FIG. 17 are assigned the same reference numbers. Instead of an instruction path coprocessor coupled to the CPU via a separate bus, data processing system 240 includes an instruction path coprocessor 242 which is coupled between CPU 222 and main memory 228. In data processing system 240, instruction path coprocessor 242 also performs the function of cache 226 of FIG. 17, and avoids the need for a separate bus between the CPU and the instruction path coprocessor.

Instruction path coprocessor 242 extends hash table 232 of FIG. 15 to contain the native instruction sequence for the translated code, not only the address of that sequence in local memory. Thus, instruction path coprocessor 242 behaves like an instruction cache and provides CPU 222 with a sequence of instructions for each translation of a foreign instruction. This architecture avoids the disruption to the flow of instructions by providing CPU 222 with an uninterrupted stream of instructions.

While the present invention has been described in the context of a preferred embodiment, it will be apparent to those skilled in the art that the present invention may be modified in numerous ways and may assume many embodiments other than that specifically set out and described above. For example, other voltage levels may be used to program the memory cell, or different numbers of control gates could be controlled with the control circuitry. Accordingly, it is intended by the appended claims to cover all modifications of the invention which fall within the true spirit and scope of the invention.

Claim elements and steps herein have been numbered and/or lettered solely as an aid in readability and understanding. As such, the numbering and/or lettering in itself is not intended to and should not be taken to indicate the ordering of elements and/or steps in the claims.

I claim:

1. A software system for operating a data processor with a native mode of instructions to execute a plurality of foreign instructions, said software system comprising:

A) a set of computer instructions for fetching a first foreign instruction and a subsequent second foreign instruction, B) a set of computer instructions for determining whether a translation in a hash table exists for a sequence of said first and second foreign instructions, wherein said translation comprises at least one native instruction an execution of which is equivalent to an execution of said first and second foreign instructions, C) a set of computer instructions for selectively creating a new translation for said first and second foreign instructions and adding said new translation to said hash table if said translation does not exist, D) a set of computer instructions for executing said new translation, and E) a machine readable medium containing the sets A–D of computer readable instructions encoded in a machine readable format.

2. A method of manufacturing the machine readable medium in claim 1 which comprises the step of:

encoding the software system in a machine readable format in the machine readable medium.

3. A method of operating a data processor capable of executing a native instruction set to execute a plurality of instructions written in a foreign instruction set, comprising the steps of:

fetching a first foreign instruction;

fetching a subsequent second foreign instruction;

determining whether a translation in a hash table exists for a sequence of said first and second foreign instructions, wherein said translation comprises at least one native instruction an execution of which is equivalent to an execution of said first and second foreign instructions;

if said translation exists, executing said translation by providing said at least one native instruction to the data processor;

if said translation does not exist, selectively performing the steps of:

creating a new translation for said first and second foreign instructions;

adding said new translation to said hash table; and executing said new translation by providing said new translation to th e data processor.

4. The method of claim 3 wherein said step of selectively performing said steps of creating, adding, and executing comprises the step of selectively performing said steps of creating, adding, and executing if a frequency of occurrence of said first and second foreign instructions exceeds a threshold.

5. A method operating a data processor capable of executing a native instruction set to execute a plurality of instructions written in a foreign instruction set, comprising the steps of:

fetching a first foreign instruction;

fetching a subsequent second foreign instruction;

selectively translating a sequence of said first and second foreign instructions into a new translation, wherein said new translation comprises at least one native instruction an execution of which is equivalent to an execution of said first and second foreign instructions; and storing said new translation in a hash table.

6. The method of claim 3 wherein said step of translating comprises the step of selectively translating said sequence of said first and second foreign instructions into said new translation if a frequency of occurrence of said first and second foreign instructions exceeds a threshold.

7. The method of claim 5 further comprising the steps of:

fetching a second sequence of said first and second foreign instructions;

fetching said new translation from said hash table; and executing said new translation.

8. A data processing system capable of executing a plurality of foreign instructions comprising a central processing unit adapted to execute a native mode instruction set and an instruction path coprocessor coupled to the central processing unit which provides native instructions to the central processing unit in response to said central processing unit initiating an instruction fetch on a foreign instruction, the improvement wherein:

the instruction path coprocessor includes a hash table; and the instruction path coprocessor selectively translates consecutive first and second foreign instructions into a new translation, wherein said new translation comprises at least one native instruction an execution of which is equivalent to an execution of said first and second foreign instructions, stores said new translation in said hash table, and thereafter provides said at least one native instruction to said central processing unit in response to said central processing unit initiating consecutive fetches of said first and second foreign instructions.

9. The data processing system of claim 8 wherein said instruction path coprocessor translates said sequence of said first and second foreign instructions into said new translation and stores said new translation in said hash table if a frequency of occurrence of said first and second foreign instructions exceeds a threshold.

* * * * *

UNITED STATES PATENT AND TRADEMARK OFFICE
CERTIFICATE OF CORRECTION

PATENT NO. : 6,044,220
DATED : March 28, 2000
INVENTOR(S) : Mauricio Breternitz, Jr.

It is certified that an error appears in the above-identified patent and that said Letters Patent is hereby corrected as shown below:

Claim 6, column 9, line 9,
After claim, delete "3" and insert --5--.

Signed and Sealed this

Thirteenth Day of February, 2001

Attest:

NICHOLAS P. GODICI

Attesting Officer    Acting Director of the United States Patent and Trademark Office